United States Patent [19]

Gilovich

[11] Patent Number: 5,343,345
[45] Date of Patent: Aug. 30, 1994

[54] MAGNETIC DISK STORAGE APPARATUS WITH MULTIPLE SETS OF ACTUATOR ARMS FOR READ/WRITE OPERATIONS AT DIFFERENT CIRCUMFERENTIAL LOCATIONS WITHIN THE DISK STACK

[76] Inventor: Paul A. Gilovich, 100 Buckingham Dr. #203, Santa Clara, Calif. 95051

[21] Appl. No.: 877,092
[22] Filed: May 1, 1992
[51] Int. Cl.⁵ .......................... G11B 5/48; G11B 5/55
[52] U.S. Cl. .................................. 360/104; 360/106
[58] Field of Search ............................... 360/104, 106

[56] References Cited

U.S. PATENT DOCUMENTS

| | | |
|---|---|---|
| 4,300,176 | 11/1981 | Gilovich et al. . |
| 4,544,973 | 10/1985 | DeBult ............................... 360/106 |
| 4,751,597 | 6/1988 | Anderson . |
| 4,800,455 | 1/1989 | Takizawa . |
| 4,937,693 | 6/1990 | Connolly et al. . |
| 5,027,242 | 6/1991 | Nishida et al. . |
| 5,034,837 | 7/1991 | Schmitz ............................... 360/106 |
| 5,218,496 | 6/1993 | Kaczeus ............................... 360/104 |

Primary Examiner—A. J. Heinz
Attorney, Agent, or Firm—Robert S. Kelly

[57] ABSTRACT

A hard disk drive for providing memory storage for a computer includes a rotatable stack of disks and a plurality of rotary actuator arms mounting magnetic heads for movement radially of the disks to read/write magnetically encoded data on each surface thereof. The actuator arms which extend between adjacent spaced disks are pivotally mounted in a scissor-like arrangement so that the radial tracking movement of the heads thereon occurs in angularly spaced locations in the disk stack. The rotary actuators are driven by a pair of drive arms extending in opposed relationship from the actuator pivot axis.

12 Claims, 3 Drawing Sheets

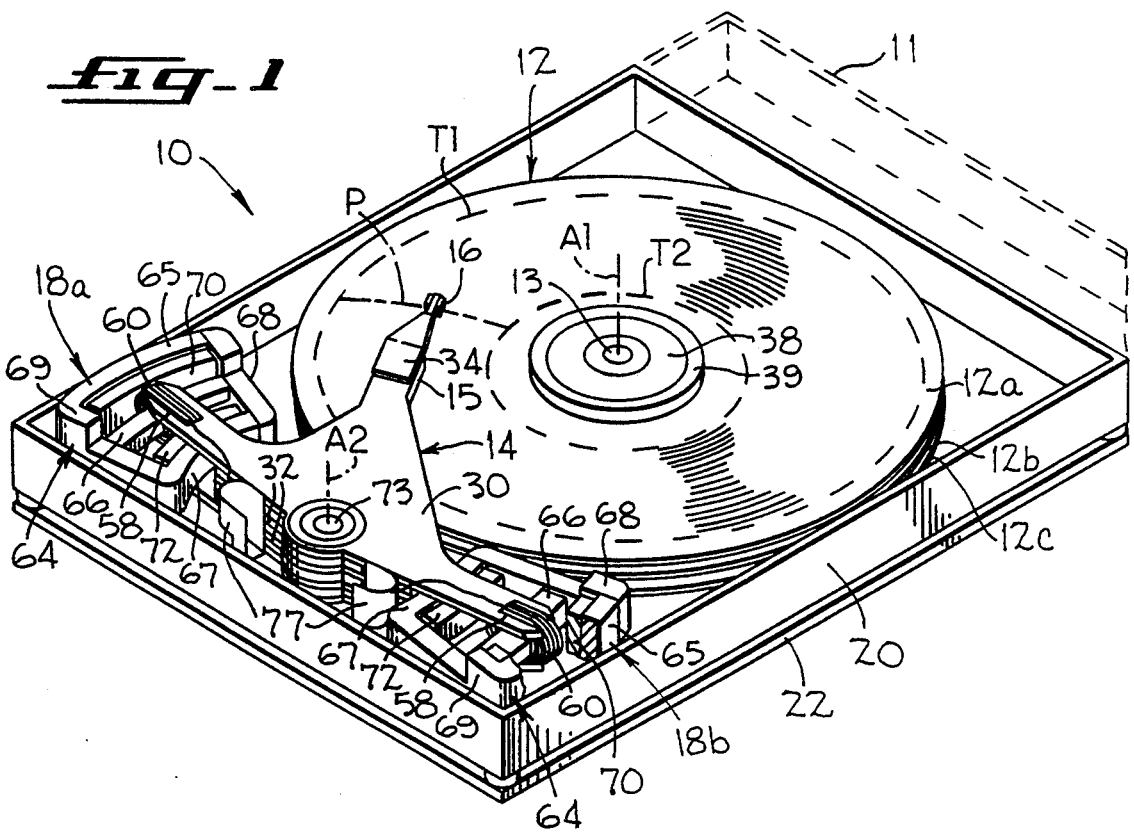
fig_1
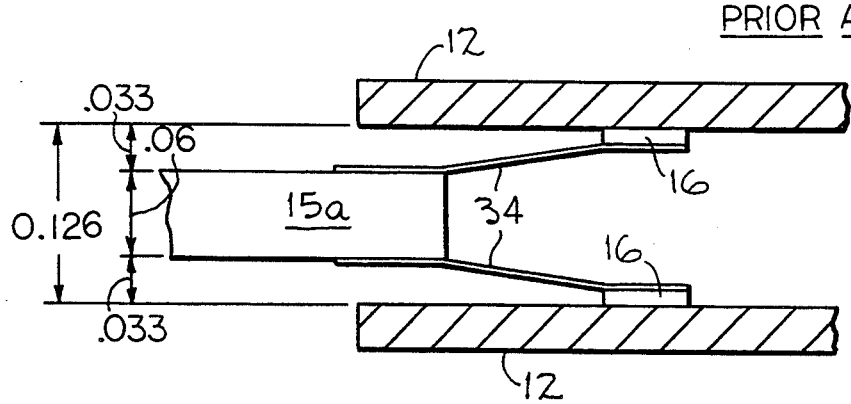
fig_2
PRIOR ART
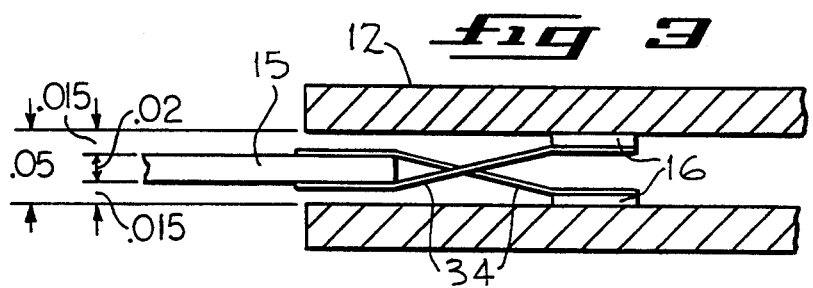
fig_3

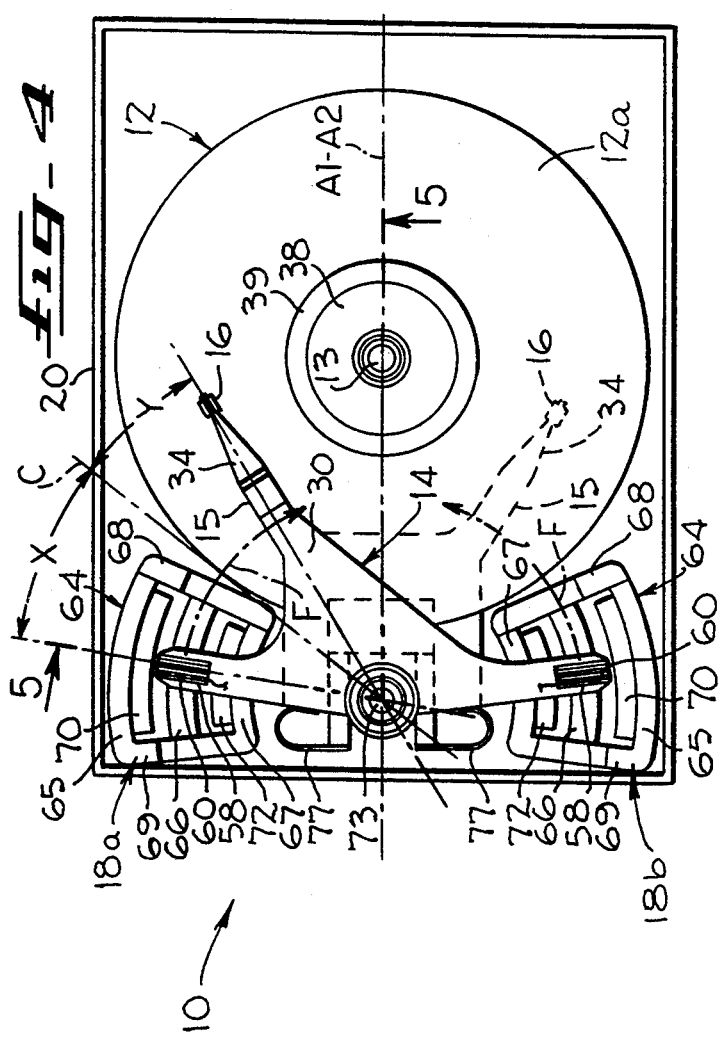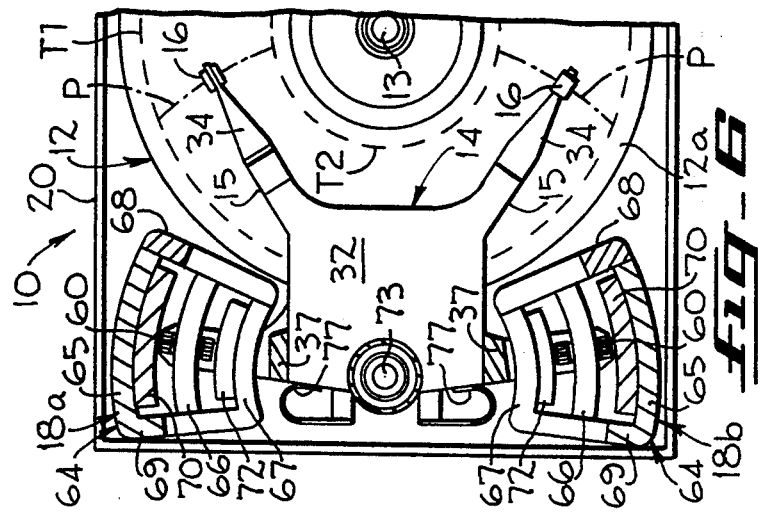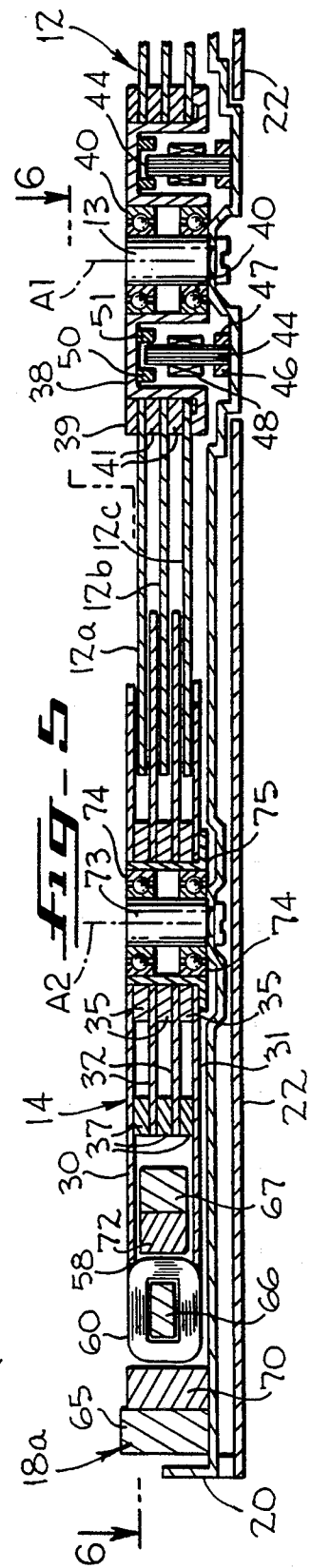

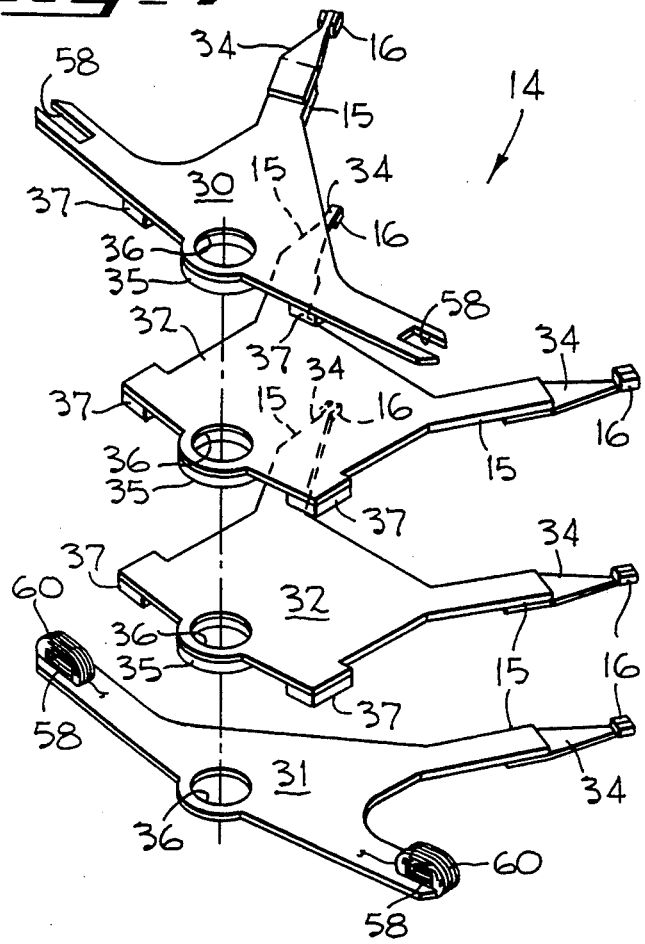
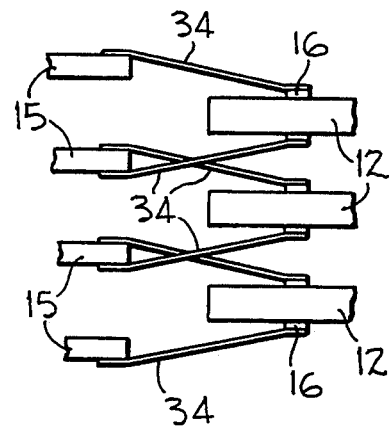
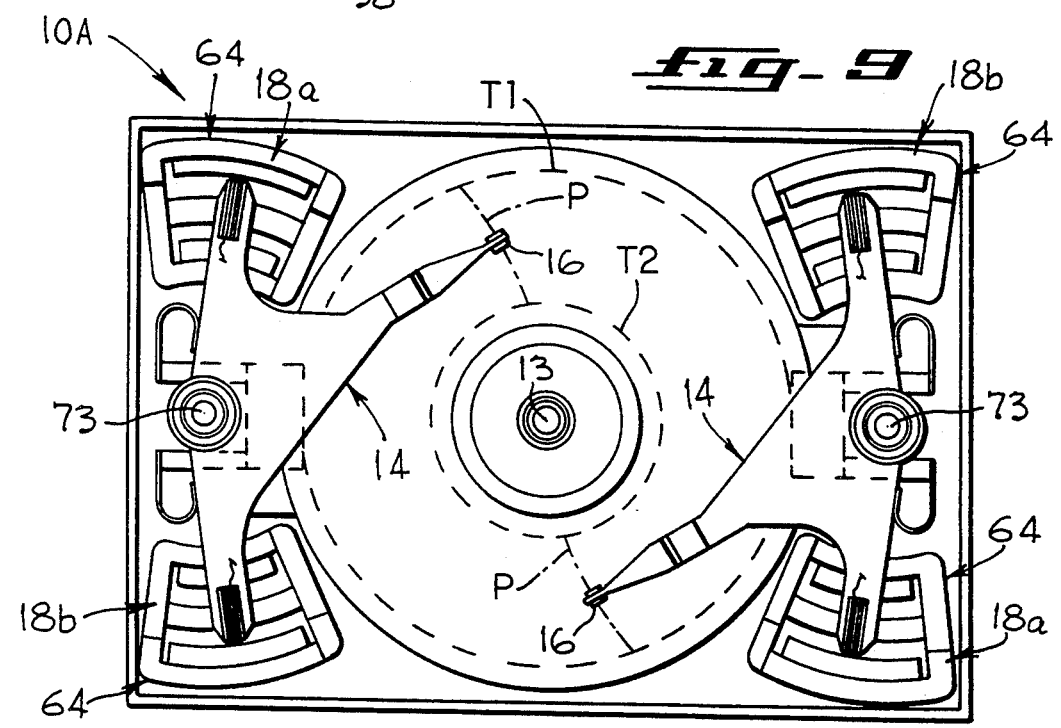

MAGNETIC DISK STORAGE APPARATUS WITH MULTIPLE SETS OF ACTUATOR ARMS FOR READ/WRITE OPERATIONS AT DIFFERENT CIRCUMFERENTIAL LOCATIONS WITHIN THE DISK STACK

BACKGROUND OF THE INVENTION

1. Field of the Invention

The present invention pertains to magnetic disk storage apparatus, and more particularly, it pertains to the high capacity hard disk drive devices having a rotatable stack of closely spaced disks with multiple magnetic head transducer arms movable radially of the stack for reading from and recording on opposite faces of each of the disks.

2. Description of the Prior Art

In today's markets, with the proliferation of the use of computers, both for personal and for business use, there is an ever increasing demand for higher and higher capacity memory devices. The basic memory storage device of computers is the so-called hard disk drive comprised of a rigid disk, or more typically a stack of closely spaced rigid disks, with actuator arms carrying tiny magnetic transducer heads being adapted to move radially within such stack of disks in comblike fashion to record and read magnetically encoded data along circumferential tracks on both faces of all of such superimposed disks. Since computers are built with certain predefined spaces for accommodating the aforedescribed hard disk drive devices, the overall dimensions of such devices nave been fixed into a plurality of package sizes or form factors. Thus, increases in the memory capacity of a disk drive device of a given industry standard size have been made either by increasing the density of the data written on a given area of a disk or by an improved mechanical design, e.g., by providing a greater number of disks in a given package size.

In addition to maximizing the number of disks in a given package size, various attempts have been made to improve the magnetic head positioning mechanisms, i.e., the actuator arms and the drive arrangments thereof, in order to improve access time, positioning precision, and reading reliability. In prior art mechanisms, two different types of magnetic head positioner mechanisms, or actuator arms, have been developed. Linear positioners comprise a carriage carrying actuator arms which are moved radially with respect to the axis of rotation of the disks in order to position the magnetic heads along various of the circumferentially arranged tracks. Pivotally mounted actuator arms, or rotational positioners, pivot about an axis parallel to the axis of the disk stack so that the magnetic heads carried at the distal ends thereof are swung in arcuate paths across the magnetically encoded tracks of the disks.

Such pivotally mounted actuator arm assemblies generally include counterbalancing drive arms provided with a voice-coil motor or servo-motor for providing the rotational movement thereto. There has been a continuing search for new and different ways to design such rotational drive mechanisms in order to improve data access time and reading reliability, and various arrangements have been proposed in order to fit within the predescribed package size dimensions and yet provide as efficient and reliable a mechanism as possible.

In a conventional actuator arm assembly of the typical prior art hard disk drive devices the actuator arms and the magnetic heads supported thereby are positioned one above the other in a superimposed arrangement so that all of the arms move jointly within the disk stack with the magnetic heads traversing identical superimposed paths across the opposed faces of the disks. This requires that the spacing between adjacent disks be such as to accomodate a pair of magnetic heads, the flexure mountings therefor, and the required supporting arm dimensions. In recent years, attempts have been made to descrease this required dimension between disks in a stack by offsetting the magnetic heads and their flexure mountings between the opposed faces of adjacent disks so that the spacing between disks can be reduced to accomodate just slightly greater than that required for the support arm and a single flexure mounting and its supported magnetic head. For example, in U.S. Pat. No. 4,800,455 to Takizawa, a linear positioning mechanism is shown wherein the magnetic head support arms for moving radially between a pair of opposed disk faces are offset and arranged at an angle to each other: thus, the required spacing between disks is just slightly more than that required for a single support arm, and offset, but identical, radial paths of movement are provided across the opposed faces of the disks by the actuator arms.

A rotational magnetic head positioning mechanism having a similar disk spacing minimization concept is shown in U.S. Pat. No. 4,937,693 to Connolly et al. In the disk drive structure shown and described in this patent, a pair of magnetic heads and their supporting flexure arms are mounted in parallel upon a pivotally mounted actuator arm and are adapted to be swung through slightly offset arcuate paths between adjacent disks of the disk stack. Such paths, however, will not be identical and will vary in length whereby the magnetic heads when starting at the same track position (the outermost concentric track on the disks) will finish at different track positions as they are moved simultaneously across the respective faces of the opposed disks. Thus, one of the heads will not fully utilize the tracking space on its disk. Furthermore, the differences in the skew angles of the head gaps of the heads with the tracks on the disks creates tracking problems which can effect the reliability of the system.

A similar rotary actuator structure for a stacked magnetic disk arrangement is shown in U.S. Pat. No. 5,027,242 to Nishida et al. Again, a pair of magnetic transducer heads are located on a pair of flexure arms mounted in generally parallel relationship on a common actuator arm. The magnetic heads and their supporting flexure arms are moved in arcuate paths across the opposed faces of a pair of opposed disks in a disk stack. In the arrangment shown and described in this patent, the problems of the apparatus of the aforedescribed U.S. Pat. No. 4,937,693 are magnified in that the tracking paths of the adjacent magnetic heads vary significantly as the magnetic heads are moved radially inwardly across the opposed disk faces so that the inner head arm passes across a significantly fewer number of the circumferentially arranged tracks. Furthermore, the difference in the paths of movement of the heads of necessity creates significant problems in maintaining acceptable skew angles of the head gaps with the recording tracks on the disk throughout the radial movement of the heads.

SUMMARY OF THE INVENTION

With the present invention a magnetic disk storage apparatus is provided which generally eliminates the aforedescribed problems encountered with prior art magnetic disk storage devices having rotary actuators carrying the magnetic transducer heads and which seek to decrease the required disk spacing by offsetting the magnetic heads and their support assemblies between opposed disk surfaces. In the present invention, as with the structure shown in the patents cited, those magnetic head support arms which are provided between a pair of opposed disks are offset in a plane parallel to the faces of the disks so that a minimum spacing may be utilized between the disks. However, the arms are angularly positioned relative to each other in such plane so that the heads may follow generally identical paths across the opposed disk surfaces but on opposite sides of the disk stack. Thus, the relationship of both of the offset magnetic transducer heads with the disk surfaces will be the same and the skew angle relationship of the magnetic heads with the data tracks will be approximately the same as found in prior rotary actuators of the conventional type wherein all of the magnetic heads are aligned along an axis parallel to the axis of rotation of the disk stack.

Furthermore, with the present invention, the actuator arm assembly carrying the magnetic transducer heads is arranged to be driven by a drive arm projecting from one of the actuator arms with the angle between such drive arm and the actuator arm being less than 90 degrees so that the drive arm and actuator arm are generally arranged at acute angles about a plane that passes through the actuator arm pivot axis tangentially to the edges of the disks. The drive arm is propelled by a motor which is spaced from the actuator pivot axis so that the line of applied force of the motor may pass through the center of percussion of the actuator arms. With such an arrangement and with the actuator arm pivot axis being located adjacent to the disk stack, the actuator assembly may be fitted into a minimal space in the overall package in order to reduce the size of the package or to permit the inclusion of a second, independent actuator assembly to be installed in the same package at the opposite end thereof without decreasing the size of the disks accommodated thereby.

Finally, because of the actuator arm assembly configuration as aforedescribed, the drive arrangment may be provided by a pair of drive arms extending in generally opposed directions and each carrying a conventional servo-motor or voice-coil motor arrangement so that each motor may be made smaller but the combined effect of the two motors will equal or surpass the effect provided by the single-motor actuator drive arrangements of the prior art. With two motors being thus provided in generally opposed positions, and with the line of applied force of each drive arm passing through the center of percussion of the adjacent actuator arms, radial loads on the pivot axis bearings are minimized and the creation of resonant frequencies in the drive system (a common problem with prior art devices) is also minimized.

BRIEF DESCRIPTION OF THE DRAWINGS

FIG. 1 in an isometric view of a magnetic disk storage module embodying the present invention, such module being shown with the cover thereof removed.

FIG. 2 is a schematic view of a typical prior art arrangement of one of the actuator arms having opposed magnetic transducer heads for reading/writing data on opposed surfaces of a pair of spaced disks in a disk stack.

FIG. 3 is a schematic view, similar to FIG. 2, but showing the actuator arm arrangement in the apparatus of the present invention.

FIG. 4 is a plan view of the magnetic; disk storage apparatus module of FIG. 1.

FIG. 5 is an enlarged section taken along line 5—5 of FIG. 4.

FIG. 6 is a reduced section taken along line 6—6 of FIG. 5.

FIG. 7 is an exploded isometric view of the rotary actuator assembly of the magnetic disk storage module of FIG. 1.

FIG. 8 is a side elevation view of the projecting end of the rotary actuator arm assembly and the supported magnetic head arrangement in the magnetic disk storage module of FIG. 1.

FIG. 9 is a plan view, similar to FIG. 4, but showing a second embodiment of the magnetic disk storage module of the present invention wherein a second set of rotary actuators are provided for a second, independent read/write interface with the disk surfaces.

DESCRIPTION OF THE PREFERRED EMBODIMENTS

Referring first to FIG. 1, there will be seen a hard disk storage module 10 with its enclosing cover removed so as to expose the various components thereof. The module will be seen to be comprised of a stack 12 of closely spaced, superimposed disks which, in the particular embodiment shown, comprise three disks 12a, 12b and 12c. These disks are mounted for rotation upon a spindle 13 and about a vertical axis A1. Mounted adjacent to the disk stack 12 is a rotary actuator assembly 14 comprised of a plurality of actuator arms 15 (the uppermost one only being shown in FIG. 1) each carrying a conventional magnetic transducer head 16 at its distal end for movement across one of the faces (upper or lower) of each of the disks 12a, 12b or 12c. The rotary actuator assembly is driven so as to move the magnetic heads 16 along arcuate paths P within the disk stack by means of a pair of voice-coil motors 18a, 18b positioned at opposed corners of the module as shown, with such head paths P permitting the recording or reading of magnetically encoded data along a plurality of concentric tracks extending from an outer track T1 to an inner track T2 across the disk faces in the well-known manner. The entire module is housed in a rectangular package of an industry standard size, or form factor, and further includes a metallic base 20 and a conventional printed circuit board assembly 22 mounted therebelow for holding the conventional electronic control and power supply components. A closing cover (not shown) is adapted to be fitted to the upturned wall of the base 20 to seal off the movable mechanical components of the module.

An important feature of the present invention is the rotary actuator assembly 14, which is shown in exploded detail in FIG. 7 of the drawings, and will be seen to be comprised (in the particular three-disk arrangement of the present invention illustrated) of an upper plate 30 having a single actuator arm 15 for reading from or writing on the uppermost surface of the top disk 12a and a lower plate 31 including a single actuator arm 15 for reading/writing communication with the bottom face of the lower-most disk 12c in the disk stack. Positioned between the upper plate 30 and the lower plate 31 are a pair of identical plates 32 each carrying a pair of actuator arms 15 extending at opposed angles in a scissor-like arrangement so as to write on or read from the opposed disk surfaces of adjacent upper and lower disks. For example, the uppermost plate 32 is adapted for read/write communication with the lower surface of disk 12a and the upper surface of disk 12b while the lower plate 32 is adapted for read/write communication with the lower surface of disk 12b and the upper surface of disk 12c. As will be obvious, with the addition of further disks in the disk stack 12, additional plates 32 may be added to the rotary actuator assembly so as to provide magnetic transducer heads 16 sufficient to provide read/write communication with all magnetically encoded disk surfaces.

Each actuator arm 15 in the rotary actuator assembly (FIG. 7) will be seen to include a thin metallic spring member, or flexure, 34 which is bonded to a projecting portion of the corresponding actuator plate 30, 31, 32. Each flexure 34 carries at its distal end a magnetic transducer head 16 by means of a conventional head gimbal assembly so that the head will be received in a parallel, closely spaced relationship (4–5 microinches) with the disk surface that it is arranged to communicate with.

The rotary actuator assembly 14 is arranged to be mounted about an upstanding pivot axis A2 that extends parallel to the disk stack axis of rotation A1 and is located so that the actuator assembly will be positioned closely adjacent to one edge of the disk stack, as seen in FIG. 1. Each of the plates 30, 31, 32 of the actuator assembly are rigidly secured together for joint rotation by means annular spacer rings 35 and spacer pads 37 (FIG. 7) which are bonded to the overlying and underlying actuator plate surfaces. A circular aperture 36 is provided at the rear edge of each of the actuator plates in alignment with the adjacent spacer ring or rings 35 to adapt the actuator assembly to be rotatably mounted about the pivot axis A2. Such mounting is best seen in FIG. 5 and will be seen to be comprised of an upstanding spindle 73 rigidly fixed to the base 20, a plurality of cylindrical bearings 74 fitted about the spindle, and a bearing sleeve 75 for receiving the actuator assembly through the apertures 36 and mounting it for rotation about the spindle axis A2.

When the disk storage module 10 is operated within a computer or the like, the disk stack 12 is arranged to be continuously rotated about the spindle 13 by means of a conventional DC motor structure which can best be seen in FIG. 5. A lamanated stator core structure of annular shape is fixed to the base 20 of the module by a pair of annular mounting rings 46, 47. Fitted within longitudinally extending slots and annularly spaced about the stator structure 44 are a plurality of coils 48 with such coils being mounted tightly about the stator lamanations and being provided with suitable connections (not shown) to a power supply. An annular mounting hub 38 is provided to rotatably mount the disk stack with such hub being rotatably secured through cylindrical bearings 40 with the upright spindle 13. Arranged upon the inner, downwardly extending face of the hub 38 are a pair of annular magnets 50, 51 which project downwardly about the upper annular end of the stator 44 so as to receive the electrical flux transfer therefrom in the well-known manner. The disks 12a, 12b and 12c of the disk stack are secured together by annular spacer members 41 positioned between the disks and by an annular clamping ring 39 above top disk 12a. In the well-known manner, the application of a DC current to the coils 48 provides an electromotive force between the stator and the annular magnets 50, 51 so as to cause the hub 38, and the disk stack 12 supported thereby, to rotate about the axis A1 of the stack.

As can be seen in the plan view of FIG. 4, the axis of rotation A2 of the rotary actuator assembly and the axis of rotation A1 of the disk stack 12 are arranged to lie in a plane A1-A2 which exactly bisects the module 10 of the present invention. Thus, those magnetic heads 16 on one side of such plane are adapted to record upon or read from the upper surfaces of the disks in the disk stack 12 while those magnetic heads 16 positioned upon the other side of the plane A1-A2 are adapted to record on or read from the bottom surfaces of the disks in the stack.

As can be best seen in FIG. 7, the uppermost actuator plate 30 and the lowermost actuator plate 31 are each provided with a pair of laterally extending drive arms with such drive arms being provided for making drive connections to the voice-coil motors 18a, 18b. Each vertically superimposed drive arm pair extends in a generally diametrically opposed direction from that of the other pair and from the aforedescribed plane A1-A2 through the axis of rotation of the disk stack 12 and rotary actuator assembly 14. The outermost end of each of the drive arms is provided with an axially extending slot 58 which is adapted to receive and be bonded to a coil 60 so that each vertically superimposed drive arm pair supports a single coil. Thus, two coils 60 are provided, one at each side of the module, and each is arranged to extend between the upper and lower actuator plates 30, 31 whereby induced movement in the coil will result in rotation of the respective drive arm about the actuator axis A2 and hence movement of the magnetic transducer heads 16 across their associated disk faces.

Each of the coils 60 is thus arranged to comprise the movable part of the voice-coil motor 18a or 18b positioned laterally of the rotary actuator axis A2. As can be seen from FIG. 1, FIG. 4 and FIG. 6, the means for imparting movement to each coil comprises a steel cage structure 64 which is adapted to be rigidly attached to the base 20 of the module. Each cage 64 includes an arcuately curved forward section 65 upon which the module cover (not shown) is adapted to sit, a narrow central arcuate section 66 which is adapted to receive for free travel therealong a respective coil 60, and a rearward arcuate section 67 positioned adjacent to the rotary actuator assembly 14. Upon the upright faces of the outer and inner sections 65, 67 are provided a pair of permanent magnets 70, 72, respectively, with the faces of such magnets being closely spaced from and in arcuate alignment with the opposed faces of the coil 60. Thus, in the conventional manner, by applying a DC current by means of leads (FIG. 1) to the coils 60, an electromotive force is induced between the coils and the surrounding magnets so as to create the required pivotal movement of the drive arms and the actuator assembly.

As can be seen in the plan view of FIG. 4, wherein the drive arms of the uppermost actuator plate 30 are positioned about midway through their arcuate path of travel, a pair of rather shallow acute angles X and Y, each less than 45 degrees, are provided between the longitudinal axis of the actuator arm 15 and the axis of the adjacent drive arm with a plane C that passes through the pivot axis A2 tangentially to the edges of the disk in the disk stack 12. While these angles X, Y will obviously change as the actuator arm 15 is rotated back and forth through its arcuate path of movement, they will both remain within narrow acute angle ranges since the drive motors 18a, 18b are conveniently positioned in laterally opposed directions from the actuator pivot axis A2 which, in turn, can be located quite closely adjacent to the edge of the disk stack 12. This preferred actuator assembly arrangement eliminates the need for excessive module space outside of the perimeters of the disks by minimizing the required spacing for the actuator arm assembly 14. As is illustrated in FIG. 1, a conventional hard disk assembly having the same size disk stack 12 and a conventional rotary actuator assembly will require an additional longitudinal dimension of the package to the standard size, as indicated by the dashed lines 11 in FIG. 1, in order to accomodate such conventional rotary actuator. Thus, the design of the present invention permits the standard package size to be reduced which reduction may be productively utilized as will be pointed out hereinafter.

It will also be noted that by providing a pair of voice coil assemblies 18a, 18b at each side of the module, each individual assembly may be made smaller dimensionally while the overall drive structure retains the same amount of opposed coil-magnet interface in order to maintain the same drive capabilities and responsiveness as those aforedescribed conventional structures of the prior art. It will further be noted, from FIG. 4, that the arcuate line of applied force F of each motor 18a, 18b passes through the center of percussion of each of the associated actuator arms 15 so as to minimize forces on the bearings 74 supporting the rotary actuator assembly 14 thereby providing greater drive efficiencies and responsiveness for the apparatus of the present invention. Also as indicated previously, the dual motor arrangement minimizes the radial loads about the pivot bearing axis A2 and thus minimizes the resonant frequencies created by the drive assembly.

An important feature of the present invention is illustrated in FIGS. 2 and 3 of the drawings. As shown in FIG. 2, a conventional hard disk drive apparatus includes actuator arms 15a which support in superimposed relationship and on opposite sides thereof a pair of flexures 34 carrying magnetic transducer heads 16 at the ends thereof for read/write engagement with the surfaces of the opposed disks 12. In the present invention (FIG. 3), a pair of offset actuator arms 15 are provided (only one being seen in FIG. 3) with one of such arms supporting the flexure 34 and magnetic head 16 assembly for reading or writing on the surface of one disk while the other actuator arm supports the flexure/magnetic head assembly for reading or writing on the other opposed disk surface. Two advantages are achieved by such an arrangement. First, since each actuator arm in the present invention need support only a single magnetic head assembly, it may be made significantly thinner than those conventional actuator arms of the prior art. Furthermore, since the flexure arms are offset from each other, one may be mounted upon the underside of its supporting actuator arm 15 while the other is mounted on the upper side of its supporting actuator arm so that the overall required spacing between the disk surfaces may be significantly reduced. The reduction in disk spacing from the conventional prior art arrangements is shown in the illustrations provided by FIGS. 2 and 3. Thus, with a typical prior art actuator arm assembly, 0.06 inches is required for the support actuator arm and 0.033 inches is required for each flexure mounting of the magnetic head 16 on the actuator arm, thereby making a total of 0.0126 inches required between adjacent disks. As shown in FIG. 3, in the present invention the actuator arm thickness may be reduced to 0.02 inches with only spacings of 0.015 inches being provided between each surface of the actuator arm and the opposed disk face and with such spacing still providing the necessary 0.033 inches for the flexure mounting of the magnetic head as in the prior art devices. Thus, the overall required spacing between disks with the actuator of the present invention is only 0.05 inches as opposed to the 0.126 inches required in typical prior art apparatus: thus, the apparatus of the present invention decreases the required spacing between disks by over one-half. It will thus be appreciated that for a given form factor, or industry standard package size of hard disk module, a greater number of disks may be included with the apparatus of the present invention thereby increasing the data capacity of the device.

A second embodiment of the invention is shown in FIG. 9 of the drawings. In the module 10A of the FIG. 9 embodiment it will be noted that there are two rotary actuator assemblies 14 provided at opposite ends of the disk stack 12 with each rotary actuator assembly being identical to and numbered similarly to the rotary actuator assembly 14 previously described with respect to the embodiment of FIGS. 1 to 8. As previously described and as pointed out in the dashed lines 11 in FIG. 1, the module size for a given disk diameter may be reduced with the apparatus of the present invention due to the decreased space required for the actuator assembly. This space savings can be utilized to provide a second actuator assembly 14 operated entirely independently of the first actuator assembly 14 so that a pair of independent read/write operations may be provided for a single disk stack. Such an arrangement of plural actuators has been utilized in hard disk drives previously, as for example with a model CP-5500 Chinook Series 5.25-inch Disk Drive manufactured by Connor Peripherals, Inc. of San Jose, Calif. However, the required spacing for the two independent rotary actuators, of conventional design, in such a module necessitates smaller diameter disks for a given module size than would be required for the same size module having only a single rotary actuator. The storage capacity of the device is thus correspondingly reduced. As pointed out previously, with the apparatus of the present invention, two rotary actuators may be accommodated within a standard packaging size or form factor without reducing the size of the disks therein and thereby retaining the full storage capacity of the module.

Although the best modes contemplated for carrying out the present invention have been herein shown and described, it will be apparent that modification and variation may be made without departing from what is regarded to be the subject matter of the invention.

What is claimed is:

1. Magnetic disk storage apparatus comprising a stack of closely spaced magnetic disks each having opposed flat faces for carrying magnetically encoded data, means for rotating said disks, a plurality of actuator arms each mounted for pivotal movement at one end thereof about an actuator pivot axis extending adjacent said stack of disks and parallel to the axis of rotation of the disks so that the arms extend within the stack between the spaced disks, each of said arms having a distal end opposite to said one end, a magnetic transducer head carried by each of the arms at its distal end, means for jointly pivoting said arms so that each of said heads traverses an arcuate path adjacent one of said faces of a disk with each disk having one head traversing a path adjacent each of its faces, the arms of each pair of actuator arms which extend between a pair of adjacent disks to traverse the opposed faces thereof being angularly offset from each other about the pivot axis in a plane parallel to the planes of the disks so that the paths traversed by the magnetic heads carried by such actuator arms are located on opposite sides of a plane through the actuator pivot axis and the axis of rotation of the stack of disks, said plane of the actuator arms between adjacent disks being parallel to the planes of the disks and passing through both arms so as to minimize the required spacing between disks in the disk stack, a pair of motors positioned at opposite sides of said plane through the actuator pivot axis and the axis of rotation of the stack of disks, a drive arm connected between each motor and said actuator arms for moving said heads on their arcuate paths across said disk faces, each drive arm being affixed to the actuator arms to rotate therewith about said pivot axis, and each of said motors being operatively connected to its respective drive arms at a position spaced from said actuator pivot axis so that the line of applied force of the motor passes through the center of percussion of those actuator arms located on the same side of said plane through the actuator pivot axis.

2. Magnetic disk storage apparatus according to claim 1 wherein said angle between the longitudinal axis of the drive arm and the longitudinal axes of the actuator arms to which it is connected is less than 90 degrees.

3. Magnetic disk storage apparatus according to claim 2 wherein said angle between the longitudinal axis of the drive arm and the longitudinal axes of the actuator arms from which it projects is approximately 50 degrees.

4. Magnetic disk storage apparatus according to claim 1 including a second plurality of actuator arms, said second plurality of actuator arms carrying magnetic heads and having a pair of drive arms and motors connected thereto similarly to the first-described plurality of actuator arms, said second plurality of actuator arms being mounted for rotation about a second actuator pivot axis, both of said actuator pivot axes lying generally in said plane extending through the axis of rotation of the disks so that the first and second plurality of actuator arms are mounted for pivotal movement at directly opposite sides of the stack of disks.

5. In a magnetic storage apparatus including a stack of hard disks in superimposed spaced relationship each having read/write surfaces on both sides thereof, an actuator arm assembly comprising a plurality of actuator arms mounted in spaced relationship adjacent said stack of disks so that the arms extend within the stack between the spaced disks, means for fixedly connecting said actuator arms for joint pivotal movement about an actuator pivot axis parallel to the axis of rotation of the disks, a magnetic transducer head mounted at the distal end of each of said actuator arms, a drive arm projecting from at least one of said actuator arms along a longitudinal drive arm axis at an angle about said actuator pivot axis from the longitudinal axis of said one actuator arm through the magnetic head supported thereby, said drive arm having a distal end spaced from the pivot axis, and a motor operatively connected to the distal end of the drive arm for pivoting said drive arm about the actuator pivot axis so as to selectively move the magnetic heads radially of the read/write surfaces of the disks, said actuator arms including at least one pair of actuator arms extending between a pair of adjacent disks for communication with the opposed read/write surfaces thereof with the actuator arms of said pair being angularly offset from each other about the pivot axis in a plane parallel to the planes of the disks so that the paths traversed by the magnetic heads carried by such actuator arms are located on opposite sides of a plane through the actuator pivot axis and the axis of rotation of the stack of disks, said plane of the actuator arms between adjacent disks passing through both arms so as to minimize the required spacing between the disks in the disk stack, the line of applied force of the drive arm passing through the center of percussion of the actuator arms.

6. In a magnetic disk storage apparatus according to claim 5 including a pair of motors and a pair of drive arms with each motor being connected to the distal end of one of the drive arms, said motors being positioned at opposite sides of said plane through the actuator pivot axis and the axis of rotation of the stack of disks, and the line of applied force of each drive arm passing through the center of percussion of those actuator arms on the same side of said plane through the actuator pivot axis.

7. In a magnetic disk storage apparatus according to claim 6 wherein said angle between each drive arm longitudinal axis and the longitudinal axis of the actuator arm to which it is connected is less than 90 degrees.

8. In a magnetic disk storage apparatus according to claim 5 wherein said angle between the longitudinal axis of the drive arm and the longitudinal axis of the actuator arm from which it projects is less than 90 degrees.

9. In a magnetic disk storage apparatus according to claim 8 wherein said angle between the longitudinal axis of the drive arm and the longitudinal axis of the actuator arm from which it projects is approximately 50 degrees.

10. In a magnetic disk storage apparatus according to claim 5 including a second actuator arm assembly, said second actuator arm assembly including magnetic transducer heads, drive arm, motor and mounting means similarly to the first-described actuator arm assembly, said second actuator arm assembly being mounted for rotation about a second actuator pivot axis, both of said actuator pivot axes lying generally in said plane extending through the axis of rotation of the disks so that the first and second actuator arm assemblies are mounted for pivotal movement at directly opposite sides of the stack of disks.

11. A magnetic disk storage module comprising a base of rectangular shape, a stack of closely spaced magnetic disks each having opposed flat faces for carrying magnetically encoded data, means for rotating said disks, a first set of actuator arms each being mounted for joint pivotal movement at one end thereof adjacent said stack of disks about a first actuator pivot axis so that the arms extend within the stack between the spaced disks, said first pivot axis being located at one end of said base, each of said arms having a distal end opposite said one end thereof, a magnetic transducer head carried by each of the arms at its distal end, first means for jointly pivoting said arms so that each of said heads traverses an arcuate path adjacent one of said faces of a disk with each disk having one head traversing a path adjacent each of its faces, the arms of each pair of actuator arms which extend between a pair of adjacent disks to traverse the opposed faces thereof being angularly offset from each other about the first pivot axis in a plane parallel to the planes of the disks so that the paths traversed by the magnetic heads carried by such actuator arms are of identical length and curvature adjacent the opposed faces of the disks but are located on opposite sides of a plane through said first pivot axis and the axis of rotation of the disks, said plane through the disk axis of rotation longitudinally bisecting the base, said plane of the actuator arms between adjacent disks being parallel to the planes of the disks and passing through both arms so as to minimize the required spacing between disks in the disk stack, said first means for pivoting comprising a first pair of drive arms connected to the actuator arms for movement therewith and extending therefrom in opposed directions from said plane through the axis of rotation of the disks, each of said drive arms having a distal end spaced from the actuator pivot axis, and a first pair of motors positioned at opposite sides of said plane through the axis of rotation of the stack of disks and directly adjacent the opposed longitudinal sides of the base, each motor being operatively connected to the distal end of one of the drive arms, a second set of actuator arms mounted for joint pivotal movement about a second actuator pivot axis located at the opposite end of the base from said first end thereof and on said plane through the disk axis of rotation, and a second means for jointly pivoting said second set of actuator arms including a second pair of drive arms and a second pair of motors connected to the second set of actuator arms in the same manner as the first set of actuator arms and first means for jointly pivoting are connected, sad second set of motors being positioned directly adjacent to the opposed longitudinal sides of the base but at the opposite ends thereof from the first set of motors.

12. A magnetic disk storage module according to claim 11 wherein the lines of force applied by each of said first and second sets of motors through the first and second sets of drive arms passes through the centers of percussion of the first and second sets of actuator arms respectively.

* * * * *